Feb. 10. 1925.
J. C. CAMPER
1,526,205
ROASTING MACHINE
Filed May 17, 1924      3 Sheets-Sheet 3
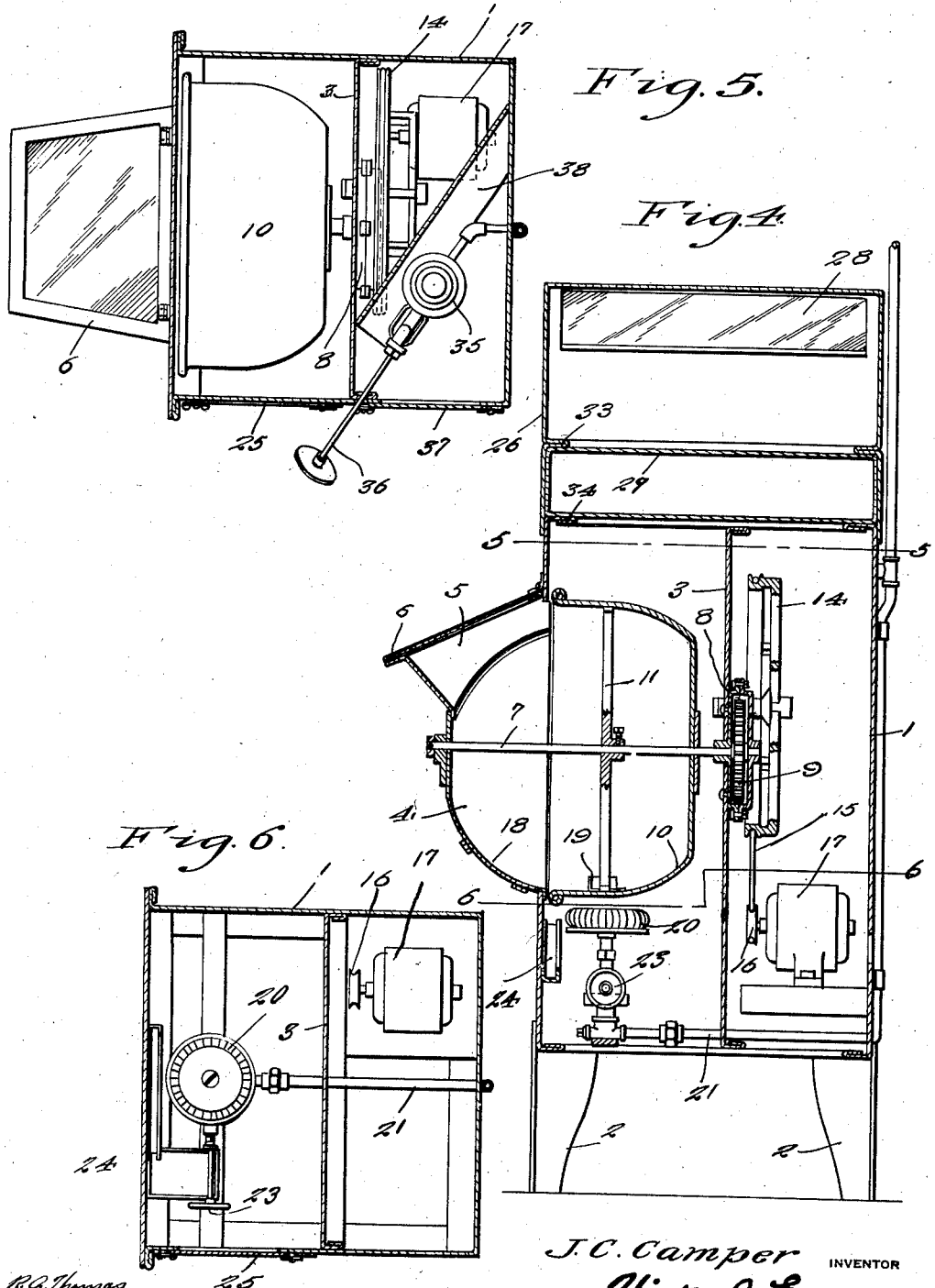

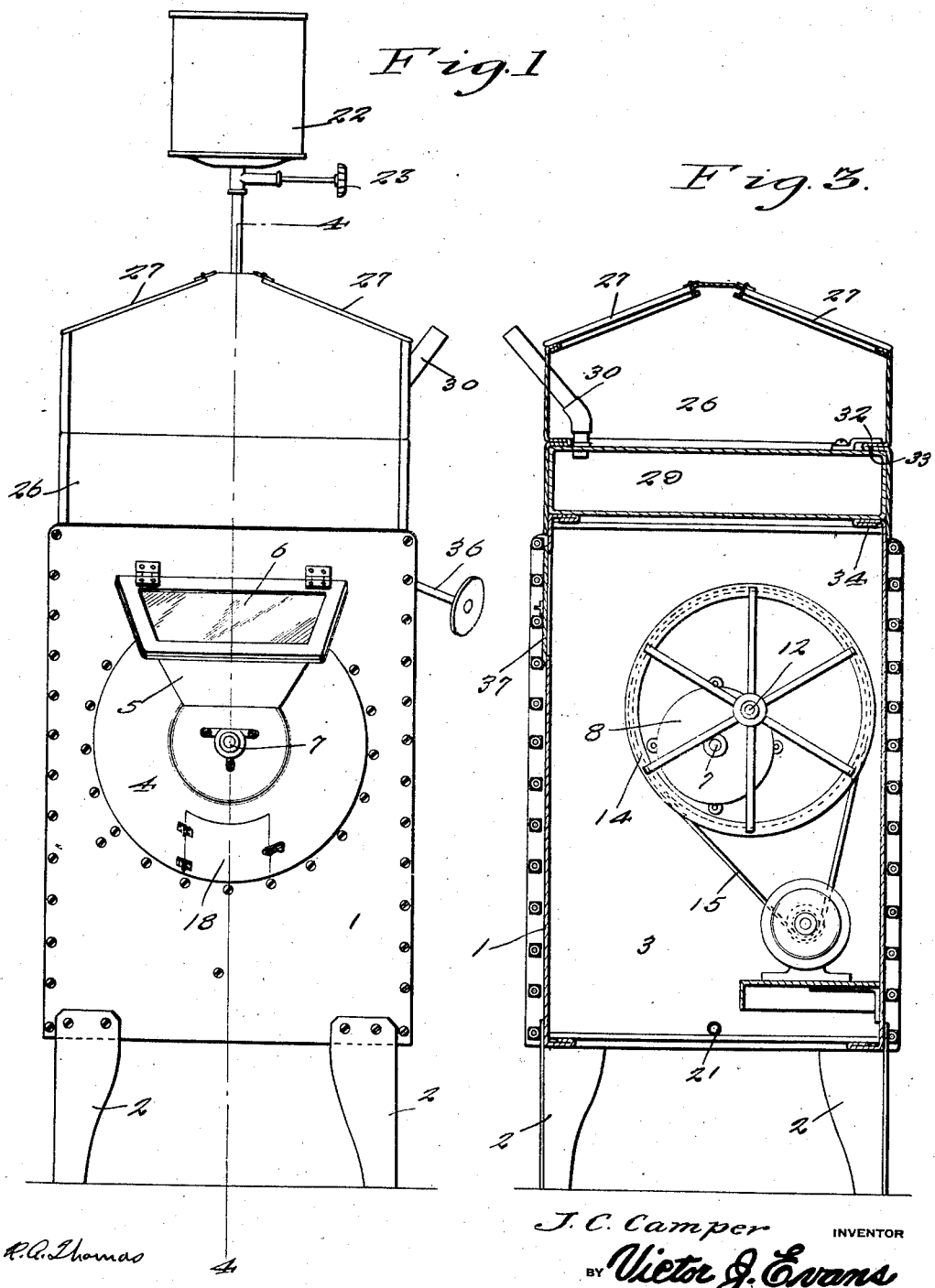

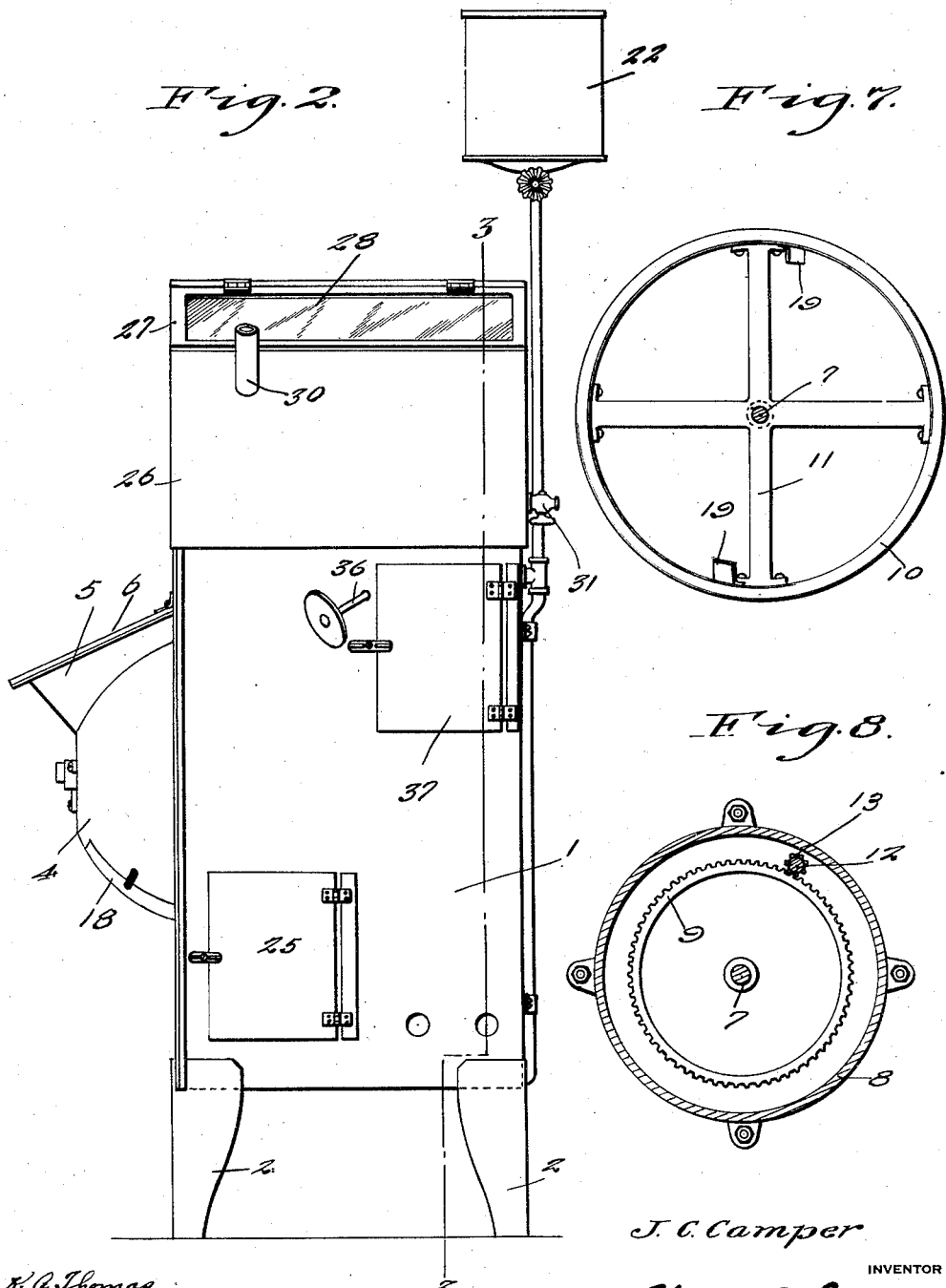

Patented Feb. 10, 1925.

1,526,205

UNITED STATES PATENT OFFICE.

JODIE C. CAMPER, OF WILSON, NORTH CAROLINA.

ROASTING MACHINE.

Application filed May 17, 1924. Serial No. 714,134.

*To all whom it may concern:*

Be it known that I, JODIE C. CAMPER, a citizen of the United States, residing at Wilson, in the county of Wilson and State of North Carolina, have invented new and useful Improvements in Roasting Machines, of which the following is a specification.

This invention relates to a roasting machine for roasting peanuts, coffee and the like and for popping pop corn, the general object of the invention being to provide means whereby the material can be treated at minimum expense and with but little attention on the part of the operator.

Another object of the invention is to provide a window in the device whereby the operation can be observed so that attention of the passerby will be attracted to the device and its contents which will serve to advertise the articles being treated.

A further object of the invention is to provide a heating chamber for the articles that have been roasted so that the articles will be kept hot until sold, with means for heating the chamber from a water tank, the water in which is heated by suitable means.

A further object of the invention is to provide means whereby the articles can be easily and quickly removed from the roasting chamber.

Another object of the invention is to provide doors in the apparatus for providing ready access to the various parts of the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a side view thereof.

Figure 3 is a section on line 3—3 of Figure 2.

Figure 4 is a section on line 4—4 of Figure 1.

Figure 5 is a section on line 5—5 of Figure 4.

Figure 6 is a section on line 6—6 of Figure 4.

Figure 7 is a front view of the rotary drum.

Figure 8 is a sectional view showing the gearing.

In these views, 1 indicates a casing which is supported by the legs 2 and which has its top open. A partition 3 divides the casing into front and rear chambers, the front chamber containing the roasting means and the rear chamber the operating means. The front of the casing is formed with a bowl-shaped extension 4 and this extension has an upwardly flaring mouth 5 which is covered by a hinged window 6 which slopes downwardly and outwardly from the front of the casing so that a person in front of the apparatus can look into the interior of the same through said window. A shaft 7 has one end journaled in the front part of the extension 4 and its other end passes into the gear housing 8 which is riveted or otherwise fastened to the partition 3 and which contains the gear 9 which is secured to the shaft 7. A bowl-shaped drum 10 is fastened to the shaft 7 by the spider 11 so that the drum will rotate with the shaft. The mouth of the drum aligns with the extension 4 and said drum and extension form a roasting chamber for the material or articles to be treated. A stub shaft 12 passes into the gear housing where it is provided with a pinion 13 which meshes with the gear 9 and said shaft 12 has connected therewith a pulley 14 over which passes a belt 15 which also engages a pulley 16 on the shaft of the motor 17. The pulley 14 is flanged as shown so that the rear chamber of the apparatus can be made small with the motor in the bottom of the chamber and its pulley located under the gear carrying part of the device. It will be seen that the drum 10 will be driven at slow speed from the motor through the belt and gears shown. A trap door 18 is arranged in the bottom of the extension 4 so that the articles can be removed from the roasting chamber and small inclined plates 19 are arranged in the drum, adjacent the arms of the spider, which not only act as agitators for the articles but also act to direct the articles to the door when the same is opened so that all the articles will be discharged through the door when the same is opened and the drum is rotated. A burner 20 is arranged under the drum and the drawings show the same as being connected by the pipes 21 with a tank 22 so that liquid fuel, such as gasoline, can be supplied to the same, the pipe being provided with suitable valves 23 for controlling the flow of fuel through the same.

As will be seen a small space is left between the mouth of the drum and the extension 4 so that dirt and other foreign matter entering the roasting chamber with the peanuts or other articles will, during the rotation of the drum, drop through this space upon an inclined trough 24 fastened to the inner side of the front of the casing and a receptacle can be placed under the lower end of the trough to receive this dirt. Access to this part of the apparatus can be had through the door 25 so that the receptacle can be removed when full.

A top casing 26 is adapted to be placed on the main casing, the top of said casing 26 being ridged and composed in part of two hinged doors 27 which are provided with transparent parts 28 so that the interior of the casing 26 is accessible and articles therein can be seen. A water tank 29 is arranged in the lower part of the casing 26 and the top of this tank forms a bottom for the casing. The tank is supplied with water through the pipes 30 and a pet cock 31 is connected with the tank and passes through a hole in the casing 26 so that the water in the tank can be drained and said cock acts as a means for testing the amount of water in the tank. The filling means and said cock also act to hold the tank in the casing 26 and in addition a latch 32 is connected with the top of the tank and is adapted to engage a flange 33 in the casing 26 to hold the tank in the casing. When the parts are in place the tank will rest upon a flange 34 at the top of the main casing. A burner 35 is arranged in the upper part of the rear chamber of the main casing so that the flame therefrom will heat the water in the tank 29 and this water will in turn heat articles placed in the casing 26 so that this casing acts as a warming chamber. This burner 35 is connected with the pipe leading from the tank 22 and it is provided with a valve, the handle 36 of which extends through the casing. A door 37 is formed in the upper part of the main casing so that access can be had to this burner and a shield 38 is arranged in the main casing adjacent said burner to prevent the heat therefrom from reaching the belt 15. Where gas is available the burners may be connected with this supply instead of using liquid fuel.

From the foregoing it will be seen that when peanuts or the like are placed in the roasting chamber which is composed of the rotary drum and the extension 4, the burner 20 lighted and the motor 17 started up the rotation of the drum 10 will agitate the articles and such articles will be heated by coming in contact with the walls of the hot drum so that the articles are roasted. The rotary movement of the drum will keep the articles moving so that all the articles in the roasting chamber will be subjected to the heating action and they will be prevented from being burned. As before stated, the roasting operation can be seen through the window 6 and after the roasting operation is completed the articles can be removed by opening the door 18 and rotating the drum. The articles can then be placed in the upper casing so that they will be kept hot until sold. These articles can also be seen through the transparent parts 28 and thus the device will act to advertise the articles to be sold and which have been treated by the device.

The articles can be treated with but little expense and with the minimum amount of attention on the part of the attendant. The parts are all ready of access through the doors and windows and the articles can be easily and quickly placed in the device and removed therefrom. Dirt and other foreign matter placed in the drum with the articles will sift therefrom onto the trough 24 and into the receptacle placed under the trough. The tank can be easily refilled with water without removing it from the device, though said tank can be removed when desired or necessary.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a casing, a roasting chamber therein, one part of which is movable, a window in the other part, means for supplying heat to the chamber and means for rotating the movable part.

2. A device of the class described comprising a casing having an extension at one side thereof forming part of a roasting chamber, a drum within the casing forming the other part of said chamber, a burner in the casing under the drum, means for rotating the drum, a window in the upper part of the extension and a door in the lower part.

3. A device of the class described comprising a casing having an extension at one side thereof forming a portion of a roasting chamber, a drum within the casing forming the other portion of the chamber, means for heating the drum, means for rotating the same, agitating means in the drum, a window at the top of the extension and a door in the bottom thereof.

4. A device of the class described comprising a casing having an extension at one side thereof forming a portion of a roasting chamber, a drum within the casing forming the other portion of the chamber, means for heating the chamber, means for rotating the drum, a window in the extension and a trough in the casing under the space between the drum and extension for catching dirt passing through said space.

5. A device of the class described comprising a casing, a roasting chamber therein, means for moving a part of the chamber, means for supplying heat to the chamber, an upper casing resting upon the top of the first casing, a water tank forming the bottom of said upper casing and means for heating the tank.

6. A device of the class described comprising a casing having an extension at its front forming part of a roasting chamber, a drum within the casing forming the other portion of the chamber, a window in the upper part of the extension, a door in the lower part, a burner in the casing under the drum, a motor in the casing, means for rotating the drum from said motor, a top casing resting upon the first casing, a door formed in part of transparent material and forming part of the top of the second casing, a water tank detachably connected with the top of the casing and forming the bottom thereof, a burner in the first casing for heating the tank and means for supplying fuel to the burners.

7. A device of the class described comprising a casing having a bowl-shaped extension at one side thereof forming a part of a roasting chamber, a bowl-shaped drum within the casing forming the second part of the chamber, a burner under the drum, means for rotating the drum, a hinged window at the top of the extension, a hinged door at the bottom thereof and agitators in the drum which act to expel the articles in the roasting chamber through said door.

8. A device of the class described comprising a casing having a bowl-shaped extension at its front forming part of a roasting chamber, a bowl-shaped drum in the casing forming the other portion of the chamber, a sloping window in the top of the extension, means for hinging the window to a part of the casing so that the window can be opened, a hinged door in the bottom of the extension, a burner under the drum, a vertical partition in the casing, a shaft passing through the roasting chamber and through the partition and to which the drum is connected, a gear connected with the inner end of the shaft, a motor in the casing in rear of the partition, a stub shaft in the chamber in rear of the partition, a pinon thereon meshing with the gear, a pulley on the stub shaft, a pulley on the motor shaft, a belt passing over said pulleys, a warming casing at the top of the main casing, a water tank therein, a burner in the main casing for heating the tank and means for supplying fuel to the burners.

In testimony whereof I affix my signature.

JODIE C. CAMPER.